United States Patent Office 3,278,741
Patented Oct. 11, 1966

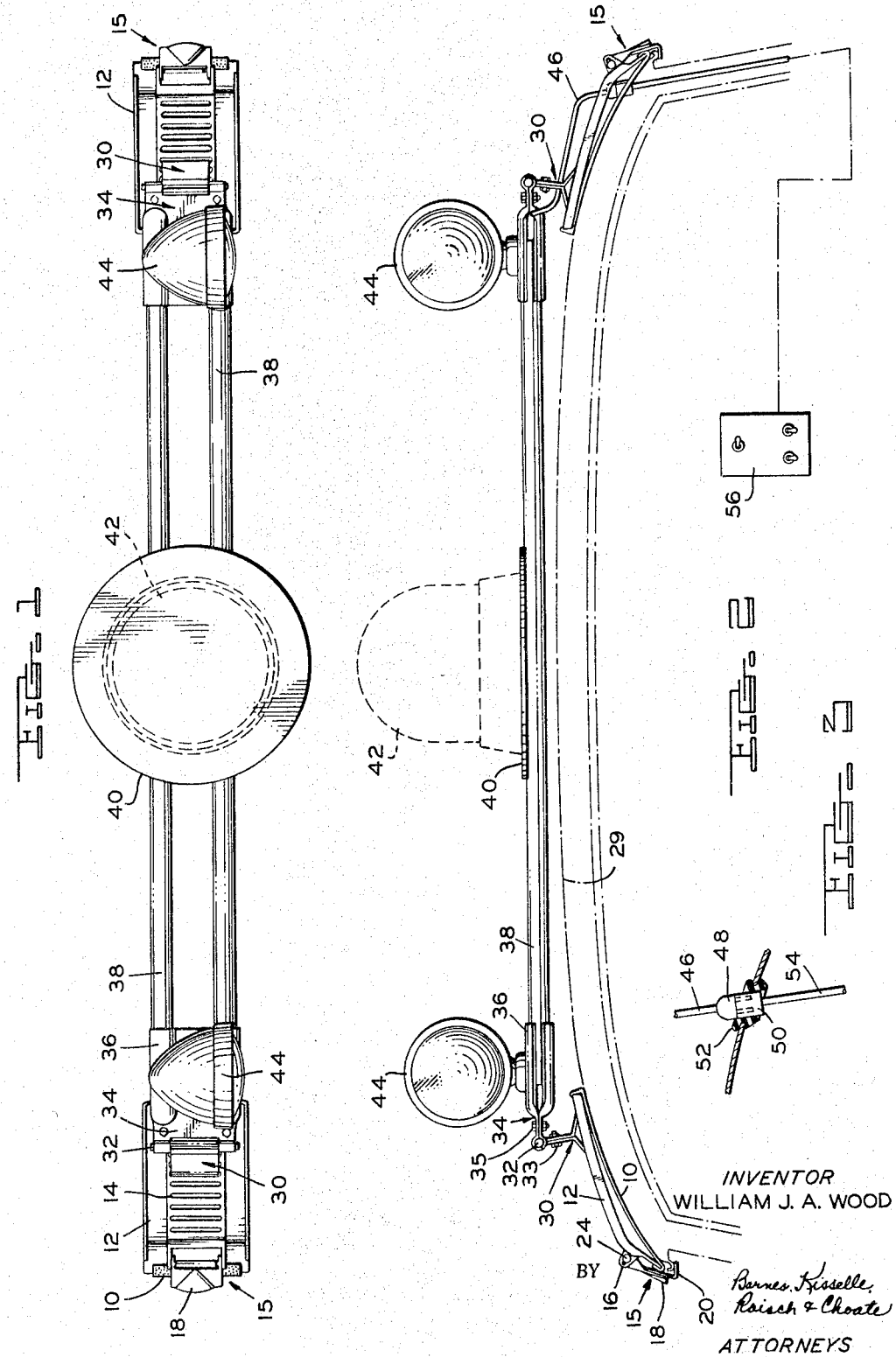

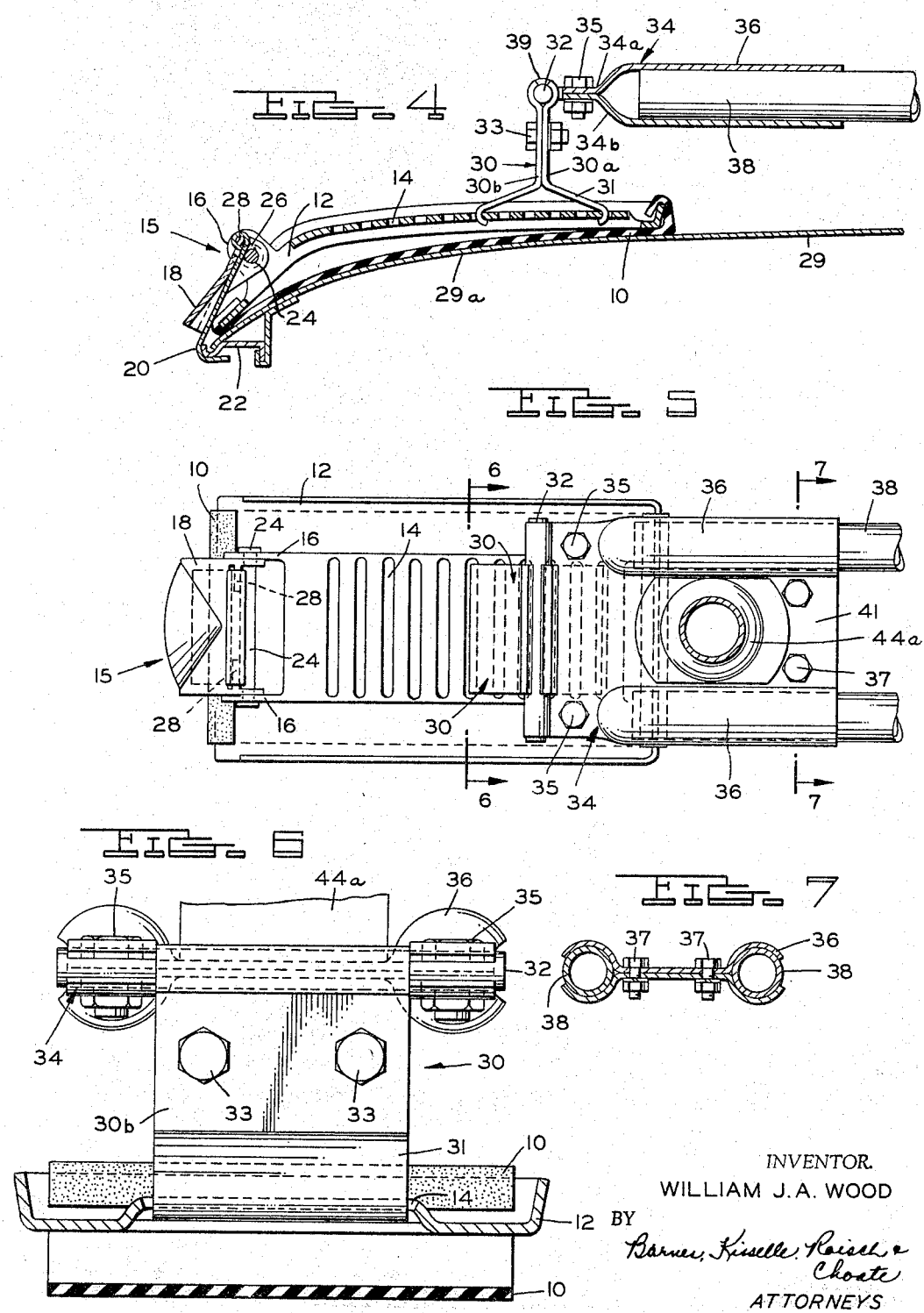

3,278,741
REMOVABLE LIGHT SUPPORT FOR VEHICLES
William J. A. Wood, Holly, Mich.
Filed Sept. 4, 1964, Ser. No. 394,561
13 Claims. (Cl. 240—7.1)

This invention relates to a removable light support for vehicles, and more particularly to a device for removably mounting illuminating means on the roof structure of an automobile or other vehicle.

The light support of the present invention is particularly suitable for converting an ordinary automobile into an automobile suitable for night police work or into an emergency vehicle. Towns and communities which have a small police force and/or a voluntary fire department usually do not have the money to purchase cars singly suited for a special purpose such as a police car, etc. In such communities it is not unusual for the local law enforcement officials and/or volunteer firemen to use their own automobiles when engaged in their work. Likewise it is not unusual for even community-owned cars to be used for dual purposes. It is desirable to have special flashing signal lights or lights for area illumination when these vehicles are used for police and fire work, particularly at night. The cost of adding such permanent illuminating or signal means is more than can be afforded, in many instances. Furthermore, a permanent installation is undesirable when the automobile may also be used for personal use.

The present invention provides for a device whereby illuminating or signal means can be quickly and easily attached to or removed from an ordinary automobile or truck. The device has adjustable features which allow its use on many types and sizes of vehicles and is inexpensive. The importance of the adjustability is apparent when it is considered that different vehicles have different widths and different roof curvature.

Accordingly, it is an object of this invention to provide a support which can be easily attached to and detached from the roof of a vehicle.

It is a further object of this invention to provide means whereby supplemental illumination can be easily added to or removed from a vehicle whenever desired without requiring substantial alteration of the vehicle body.

It is a further object of this invention to provide an attractive support for the top of vehicles which is adjustable so that it can fit many types and sizes of vehicles.

Further advantages and objects will be apparent from the accompanying figures and description.

FIG. 1 is a top view of the removable light support of the present invention provided with illuminating means and a flashing beacon light.

FIG. 2 is an end view of the device illustrating the manner in which it is attached to the roof structure of a vehicle.

FIG. 3 is a sectional view showing the manner in which the lights on the device may be connected to the electrical system of the vehicle.

FIG. 4 is a fragmentary sectional view of the device attached to the roof structure of a vehicle.

FIG. 5 is a fragmentary top view of the device.

FIG. 6 is a sectional view along the line 6—6 in FIG. 5.

FIG. 7 is a sectional view along the line 7—7 in FIG. 5.

Referring now to the drawings, the support is comprised of a pair of base plates 12 which extend inwardly from the opposite edges of the roof of the vehicle and are generally curved in section as shown in FIG. 4. A piece of protective material 10 such as rubber lies between the base plate and the roof, thereby preventing damage to the finish of the vehicle. The support is attached to the roof of the car by toggle mechanisms 15 which are anchored to upwardly struck ears 16 on the base plate 12. Each toggle clamping mechanism includes a release lever 18 which is pivotally attached to ears 16 as by a pintle 24 and a locking lever 20 which underlies release lever 18 and is pivotally attached to it by inwardly projecting lugs 28 on lever 18. The pintles 24 are mounted in elongated apertures 26 in ears 16. When the toggle mechanism is locked as illustrated in FIG. 4, locking lever 20 locks around the rain channel 22 to clamp base plate 12 firmly and the roof 29 of the vehicle. Each base plate 12 also contains a series of parallel slots 14 which are provided for adjustment purposes as hereinafter explained.

Brackets 30 are mounted in slots 14 and serve to hold the transversely extending tubes on bars 38 above the plane of the roof 29 of the vehicle. Brackets 30 are of generally inverted Y shape and each consists of two angle plates 30 and 30b fastened together by bolts 33 with the angled legs 31 terminating in inwardly turned hooks which engage the slots 14, thereby holding brackets 30 securely in place. The upper portions of the plates 30a and 30b terminate in arcuate portions forming a groove 39 therebetween when the plates are fastened together.

Pins 32 are clamped in grooves 39. End fittings 34 which support transversely extending bars 38 are hinged on pins 32. These end fittings 34 in the present embodiment are comprised of top and bottom plates 34a and 34b, respectively, fastened together by bolts 35 and 37. Both the upper and lower plates of end fittings 34 have spaced, parallel embossments 36 which, when the plates are fastened together, form sockets for telescopically receiving the rod-like ends of the transversely extending bars 38. The flat area 41 on top plate 34a between the embossments 36 provides a surface for the mounting of a light 44. Each light 44 is connected to the top plate 34a of its fitting 34 by a swivel base 44a which enables adjustment of the light. Lights 44 may be in the nature of spot lights, flashing signal lights, etc. Bars 38 extend transversely of the vehicle and their opposite ends are received in the sockets on the end fittings 34. The transversely extending bars 38 are particularly adapted for supporting illuminating means. Embossments 36 are dimensioned such that when the bolts 35, 37 are tightened, the ends of bars 38 are firmly clamped therebetween.

As shown in FIG. 2, bars 38 support a base plate 40 upon which can be mounted a rotating beacon light 42 or other illuminating means. An electric cord 46 connects the lights 44 and 42 with a control switch 56 suitably mounted inside the vehicle. The cord 46 passes through the transversely extending bars 38, which protects it from the weather. This cord extends out one end of the support and plugs into an electrical socket 50 as sown in FIG. 3. The socket 50 may be located in a hole through the roof of the vehicle and a gasket 52 provides a weather seal around the socket 50. Cord 54 connects the socket 50 with switch 56.

To place the support in position on the top of a vehicle, the base plates 12 are placed on the roof 29 adjacent the opposite side edges. The release levers 18 are pivoted upwardly. This rotates the toggle locking mechanism about pivot 24, thereby moving the locking clamps 20 downward. The hooked ends of locking levers 20 are engaged under the rain channel 22 along the edge of the vehicle and release levers 18 are pivoted downwardly to lock the toggle mechanism. When levers 20 are in the locked position, the support is securely attached to the top of the vehicle.

There are two ways to adjust the support so that it will fit vehicles of different size. Bolts 33 on the brackets 30 can be loosened, thereby allowing the hooks to be disengaged from the slots 14. The brackets can then be re-engaged in slots away from or toward the center of the vehicle. Whether adjustment is necessary will depend both on the width of the vehicle and the degree of curvature of the roof. The transversely extending bars 38 can be positioned high enough to clear the roof of the vehicle and yet not so high as to be unsightly. When the bolts 33 are tightened, the support is again anchored in position. When the brackets 30 are moved inwardly or outwardly bolts 35 and 37 must also be loosened to allow the movement of the transversely extending bars 38 within their sockets. After the brackets 30 have been secured in position, these bolts 35 and 37 are tightened, thereby securely positioning the transversely extending bars 38 in their sockets. For example, referring to FIG. 4, if the roof 29 of the vehicle had less crown or if the rain channels 22 were located at a higher level on the vehicle body, the spacing between bars 38 and roof 29 might be considered excessive. Under such circumstances, brackets 30 could be relocated to a more outwardly and lower position on base plates 12 to adjust the height of bars 38 in relation to the top of the vehicle. This adjustment is possible because of the telescopic connection between bars 38 and end fittings 34 and by reason of the hinged connection at pins 32.

The lights are connected for operation by inserting the plug 48 at the end of the cord 46 in the socket 50 which is located in the roof of the automobile. The cord 54 from the socket is connected at the outer end to the switch 56 which controls the operation of the lights.

I claim:

1. A portable light support adapted to be removably mounted atop a vehicle comprising a pair of base plates, means for removably fastening said base plates on the roof structure of a vehicle, brackets mounted on said base plates for adjustment towards and away from the center of the roof structure, support means pivotally attached to said brackets, a transversely extending element adjustably fixed to said support means and light means attached to said support.

2. A device as defined in claim 1, wherein said base plates have a series of perforations therein with which said brackets are selectively engageable for said adjustment.

3. A device as defined in claim 2, wherein said brackets each have spaced projections adapted to engage said perforations.

4. A device as defined in claim 1, wherein said support means comprise fittings having sockets therein adapted to receive the ends of said transversely extending element.

5. A device as defined in claim 4, wherein said fittings are comprised of an upper and lower plate having embossments thereon, said embossments being complementary to form sockets when said plates are fastened together and means for fastening said plates together to firmly clamp the ends of said transversely extending element therebetween.

6. A device as defined in claim 1, including means for connecting said light means to an operative switch inside said vehicle.

7. A device as defined in claim 2, wherein said brackets are generally of inverted Y shape, the legs of said brackets terminating in hooks adapted to engage said perforations.

8. A light support adapted to be removably mounted on the roof structure of a vehicle comprising a pair of curved base plates adapted to be positioned one at each of the opposite side edges of the roof structure of the vehicle adjacent the rain channels, clamps on said base plates adapted to engage with the rain channels for firmly clamping said base plates to said roof structure, said base plates each having in the curved portion thereof a series of perforations which extends in a direction transversely of the vehicle when the base plates are mounted thereon, an upright bracket on each base plate, each bracket having hook portions at its lower end selectively engaged in said perforations such that the transverse spacing between the two brackets and the height of the brackets relative to the roof structure is variable in accordance with the selected perforations on the base plates with which the hook portions are engaged, a transversely extending support having a hinged connection at its opposite ends with the upper ends of said brackets and light means mounted on said transverse support, said transverse support being extensible to accommodate adjustment of said brackets on said base plates.

9. A device as defined in claim 8, wherein said transverse support comprises a transversely extending structure having a pair of parallel rod-like formations at each of its opposite ends, an end fitting telescopically engaged with said rod-like formations at each end and means clamping said end fittings on said rod-like formations in a selected position of telescopic adjustment, said end fittings being hingedly connected with the upper ends of said brackets.

10. A device as defined in claim 9, wherein said end fittings comprise juxtaposed upper and lower plates having grooves therein which cooperate to define sockets for reception of said rod-like end formations, said clamping means comprising means for clamping said plates together, said grooves being dimensioned such that when said plates are clamped together, said rod-like formations are frictionally clamped in said grooves.

11. In combination, a vehicle having a crowned roof with rain channels extending along opposite side edges thereof, a removable light support mounted on said vehicle comprising a pair of base plates positioned on said roof structure, one adjacent each rain channel and extending from said rain channels upwardly and towards each other, each base plate having a series of perforations which extends transversely of the vehicle when said light support is mounted on said vehicle, clamps on said base plates engaging said rain channels and firmly attaching said base plates to said roof, an upright bracket on each base plate, said brackets having their lower ends terminating in hook portions engaging said perforations such that the distance between said brackets and the height of said brackets relative to said roof is variable in accordance with which of said perforations said hook portions are selectively engaged, and extensible transversely extending support having its opposite ends hingedly connected with said brackets and light means mounted on said support.

12. A device as defined in claim 11, wherein said transverse support comprises a transversely extending structure having a pair of rod-like formations at each of its opposite ends, and fittings pivotally attached to said brackets, said fittings being adapted to telescopically receive said rod-like formations, and means for clamping said rod-like formations in a selected position of telescopic adjustment.

13. A device as defined in claim 12, wherein said fittings comprise juxtaposed upper and lower plates having grooves therein which cooperate to define sockets for reception of said rod-like end formations, said clamping means comprising means for clamping said plates together, said grooves being dimensioned such that when said plates are clamped together, said rod-like formations are frictionally clamped in said grooves.

References Cited by the Examiner
UNITED STATES PATENTS

| | | | |
|---|---|---|---|
| 2,584,292 | 2/1952 | Rogers | 240—7.1 X |
| 2,699,492 | 1/1955 | Cookenboo | 240—52 X |
| 2,782,972 | 2/1957 | Binding | 224—42.1 |
| 2,783,367 | 2/1957 | Locke | 240—52.1 |
| 2,831,960 | 4/1958 | Heiser | 240—7.1 |
| 3,059,105 | 10/1962 | Roe et al. | 240—8.3 |

NORTON ANSHER, *Primary Examiner.*